United States Patent
Higaki et al.

(10) Patent No.: US 7,398,136 B2
(45) Date of Patent: Jul. 8, 2008

(54) BIPED ROBOT CONTROL SYSTEM

(75) Inventors: Nobuo Higaki, Wako (JP); Takamichi Shimada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 826 days.

(21) Appl. No.: 10/808,336

(22) Filed: Mar. 25, 2004

(65) Prior Publication Data

US 2004/0193323 A1    Sep. 30, 2004

(30) Foreign Application Priority Data

Mar. 31, 2003    (JP)    ............................. 2003-095484

(51) Int. Cl.
G05D 1/02    (2006.01)
B25J 9/16    (2006.01)
B25J 13/00    (2006.01)
B25J 19/00    (2006.01)

(52) U.S. Cl. ....................... 700/255; 700/245; 700/250; 700/252; 700/259

(58) Field of Classification Search ................. 700/255, 700/259; 382/153
See application file for complete search history.

(56) References Cited

U.S. PATENT DOCUMENTS 5,378,969 A * 1/1995 Haikawa ................. 318/568.12
7,120,518 B2 * 10/2006 Takenaka et al. ............ 700/245
7,191,036 B2 * 3/2007 Takenaka et al. ............ 700/245

FOREIGN PATENT DOCUMENTS

| JP | 05-297940 | 11/1993 |
|----|-----------|---------|
| JP | 5-93778 | 12/1993 |
| JP | 10-143245 | 5/1998 |
| JP | 2002-326173 | 11/2002 |
| JP | 2003-050559 | 2/2003 |

OTHER PUBLICATIONS

Don Murray & James Little, "Using Real-Time Stereo Vision for Mobile Robot Navigation", from Autonomous Robots 8, pp. 161-171, pub 2000 by Kluwer Academic Publishers.*
Eric Huber & David Kortenkamp, "Using Stereo Vision to Pursue Moving Agents with a Mobile Robot", IEEE International Conference on Robotics and Automation, 1995, pp. 2340-2346.*

(Continued)

*Primary Examiner*—Thomas G. Black
*Assistant Examiner*—Lin B Olsen
(74) *Attorney, Agent, or Firm*—Squire, Sanders & Dempsey, LLP.

(57) ABSTRACT

In a biped robot control system, stereoscopic images captured by CCD cameras are analyzed, the analyzed images are then utilized to detect presence of any moving object around the robot and if it present, to calculate moving object information, and based on the calculated moving object information, it is determined whether or not walking of the robot needs to be stopped. If it is determined to be stopped, the robot is controlled to stop within a period that brings the travel distance at stopping (distance moved between image capture by the CCD cameras and stopping of robot walking) to within a predetermined distance. With this, when the robot approaches a moving object during walking, it can be stopped within the predetermined distance to avoid collision with the moving object.

10 Claims, 10 Drawing Sheets

OTHER PUBLICATIONS

Gordon Cheng & Alexander Zelinsky, "Real-Time Visual Behaviours for Navigating Mobile Robot", Proc. Intelligent Robots and Systems, 1996, pp. 973-980.*

Hoshi Koyasu, Jun Miura & Yoshiaki Shirai, "Recognizing Moving Obstacles for Robot Navigation using Real-Time Omnidirectional Stereo Vision", J. of Robotics and Mechatronics, vol. 14, No. 2, 2002, pp. 147-156.*

Masahiro Fujita, Yoshihiro Kuroki, Tatsuzo Ishida & Toshi T. Doi, "A Small Humanoid Robot SDR-4X for Entertainment Application" Proc. of 2003 IEEE/ASME Int. Conf. on Advanced Intelligent Mechatronics, pp. 938-943.*

Sang-Cheol Park % Seong-Whan Lee, "Fast Distance Computation with a Stereo Head-Eye System", Biologically Motivated Computer Vision, Lecture Notes in Computer Science, 2000, pp. 434-443.*

Yagi, Yasushi et al., *"Reactive Visual Navigation Based on Omnidirectional Sensing-Path following and Collision Avoidance"*, Transactions of the Institute of Systems, and Information Engineers, vol. 14, No. 3, pp. 37-45 Apr. 15, 2001.

* cited by examiner

BIPED ROBOT CONTROL SYSTEM

CROSS REFERENCE TO RELATED APPLICATIONS

This application claims priority of Japanese Patent Application No. 2003-095484, filed on Mar. 31, 2003, the entire contents of which are incorporated herein by reference.

BACKGROUND OF THE INVENTION

1. Field of the Invention

This invention relates to a biped robot control system, particularly to a biped robot control system that detects moving objects such as obstacles and human beings from captured images and controls the driving of leg members in accordance with the position of the detected moving objects.

2. Description of the Related Art

One known biped robot control system that controls the driving of leg members based on captured images is described in Japanese Patent No. 3176701 (see paragraphs 0013-0027, for example). The system taught by this patent stores a walking environment map including obstacles in a ROM (read-only memory) beforehand, ascertains its own (the robot's) position in the environment in which it moves using images taken by a CCD (charge-coupled solid-state imaging device) and controls the driving of the robot's leg members so as not to collide with the obstacles.

Although this known system can prevent collision with obstacles (stationary objects) registered in advance it cannot avoid collision with obstacles other than the registered ones and, in particular, cannot avoid collision with humans and other bodies that move freely within the walking environment.

SUMMARY OF THE INVENTION

An aspect of this invention is therefore to overcome the foregoing drawback by providing a biped robot control system that can prevent collision with moving objects.

According to this invention, there is provided a system for controlling a biped robot having a body and two legs each connected to the body, comprising: a plurality of cameras mounted on the robot and capturing a stereoscopic image around the robot; captured image analyzer inputting and analyzing the image captured by the cameras; moving object detector detecting presence of a moving object around the robot based on the analyzed image and if detected, calculating a position and an angle of the moving object relative to the robot; stop motion determinator determining whether a motion of the robot needs to be stopped based on the detected position and angle of the moving object relative to the robot; and robot motion controller controlling the robot to stop the motion when the motion of the robot is determined to be stopped, such that a distance of travel of the robot from the capture of image to the stopping of motion of the robot falls within a predetermined distance.

BRIEF DESCRIPTION OF THE DRAWINGS

The above and other aspects and advantages of the invention will be more apparent from the following description and drawings, in which:

FIG. 16 is a time chart showing processing steps in the course of stopping the biped robot shown in FIG. 1, time periods required for each step, and the like.

DETAILED DESCRIPTION OF THE PREFERRED EMBODIMENT

A biped robot control system according to an embodiment of this invention will now be explained with reference to the attached drawings.

Figure 1:
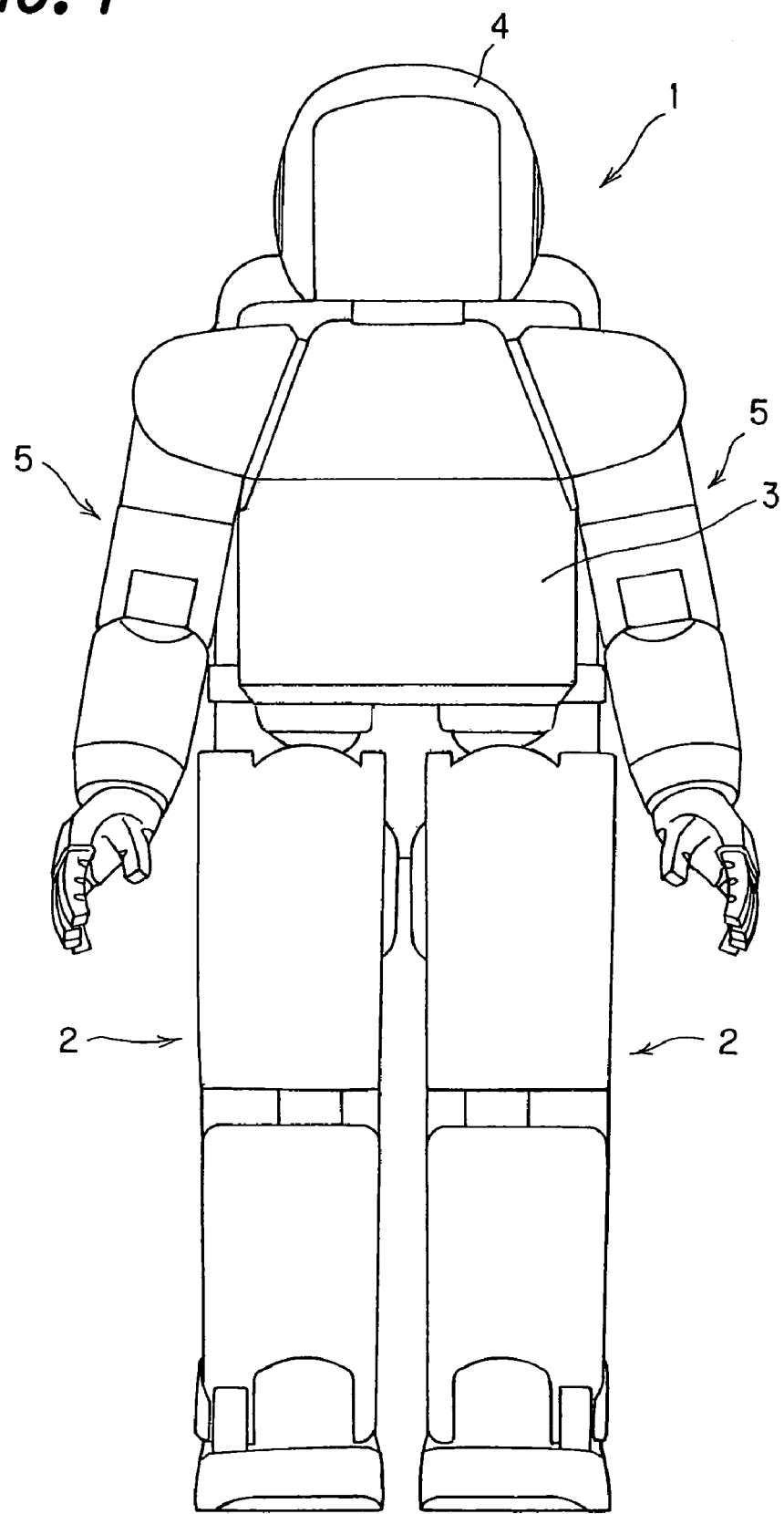
FIG. 1 is a front view of a biped robot equipped with a biped robot control system according to an embodiment of this invention.
Figure 2:
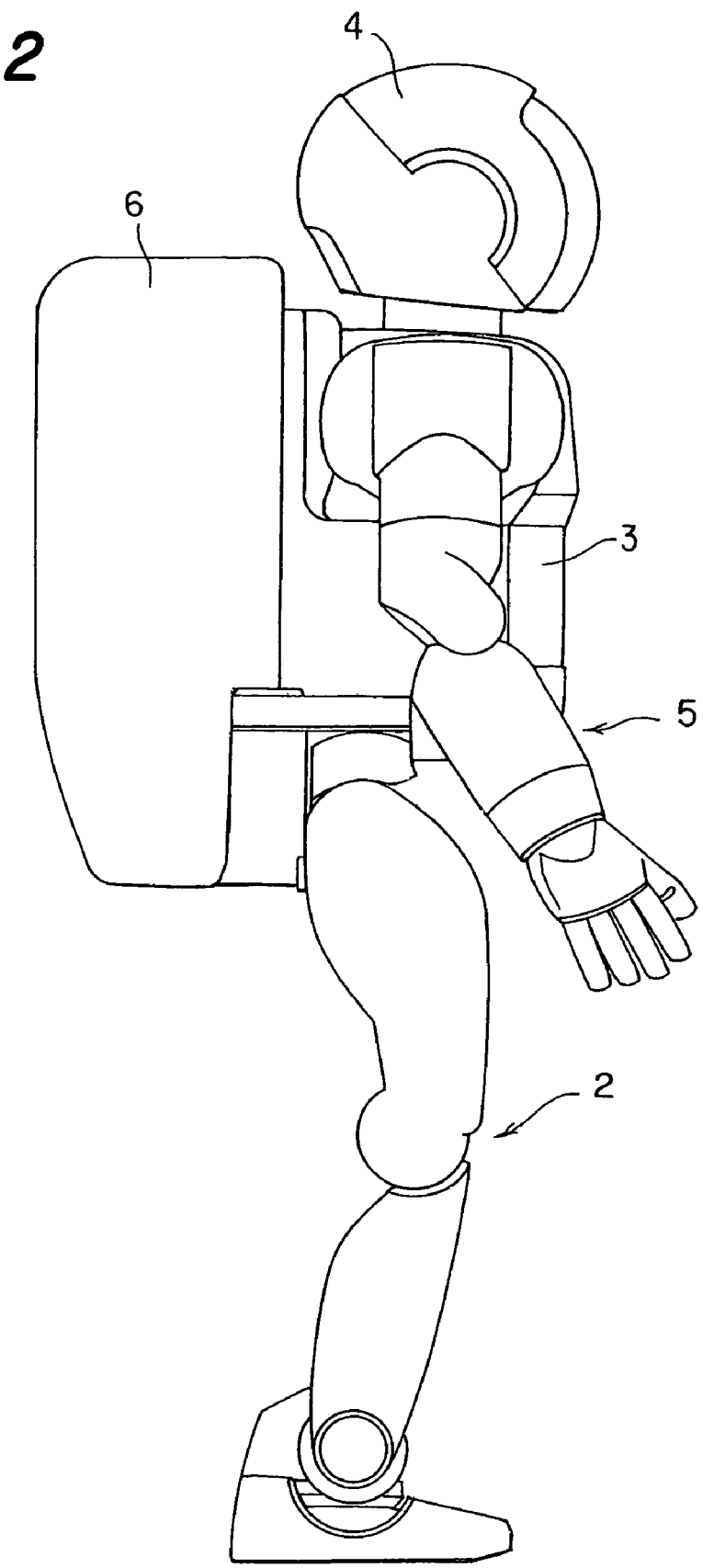
FIG. 2 is a right side view of the biped robot shown in FIG. 1.

FIG. 1 is a front view of a biped robot (hereinafter called "robot") 1 according to an embodiment of this invention, and FIG. 2 is a side view thereof.

As shown in FIG. 1, the robot 1 is equipped with two legs 2, above which is provided a body (main unit) 3. A head 4 is provided at the upper part of the body 3 and two arms 5 are connected to opposite sides of the body 3. Further, as shown in FIG. 2, a housing unit 6 is provided on the back of the body 3. The housing unit 6 accommodates, among other components, an ECU (electronic control unit; explained later) and a battery power supply (not shown) for the electric motors that drive the joints of the robot 1. The robot 1 shown in FIGS. 1 and 2 is equipped with covers for protecting its internal structure.

The internal structure of the robot 1 will now be explained with reference to FIG. 3, focusing chiefly on the joints.

As illustrated, the right and left legs 2 of the robot 1 are each equipped with six joints, for a combined total of twelve joints, namely, joints 10R, 10L (R and L indicating the right and left sides; hereinafter the same) around the hip vertical axis (Z axis or gravity axis) for leg swiveling, roll direction (around X axis) joints 12R, 12L of a crotch (hips), pitch direction (around Y axis) joints 14R, 14L of the crotch (hips), pitch direction (around Y axis) joints 16R, 16L of knees, pitch direction (around Y axis) joints 18R, 18L of ankles, and roll direction (around X axis) joints 20R, 20L of the ankles. Feet 22R, 22L are attached to the lower ends the legs 2R(L).

Thus each leg 2 includes the crotch joints (hip joints) 10R(L), 12R(L) and 14R(L), knee joint 16R(L) and ankle joints 18R(L) and 20R(L). The crotch joints and knee joint are connected by a thigh link 24R(L) and the knee joint and ankle joints by a crus link 26R(L).

Figure 3:
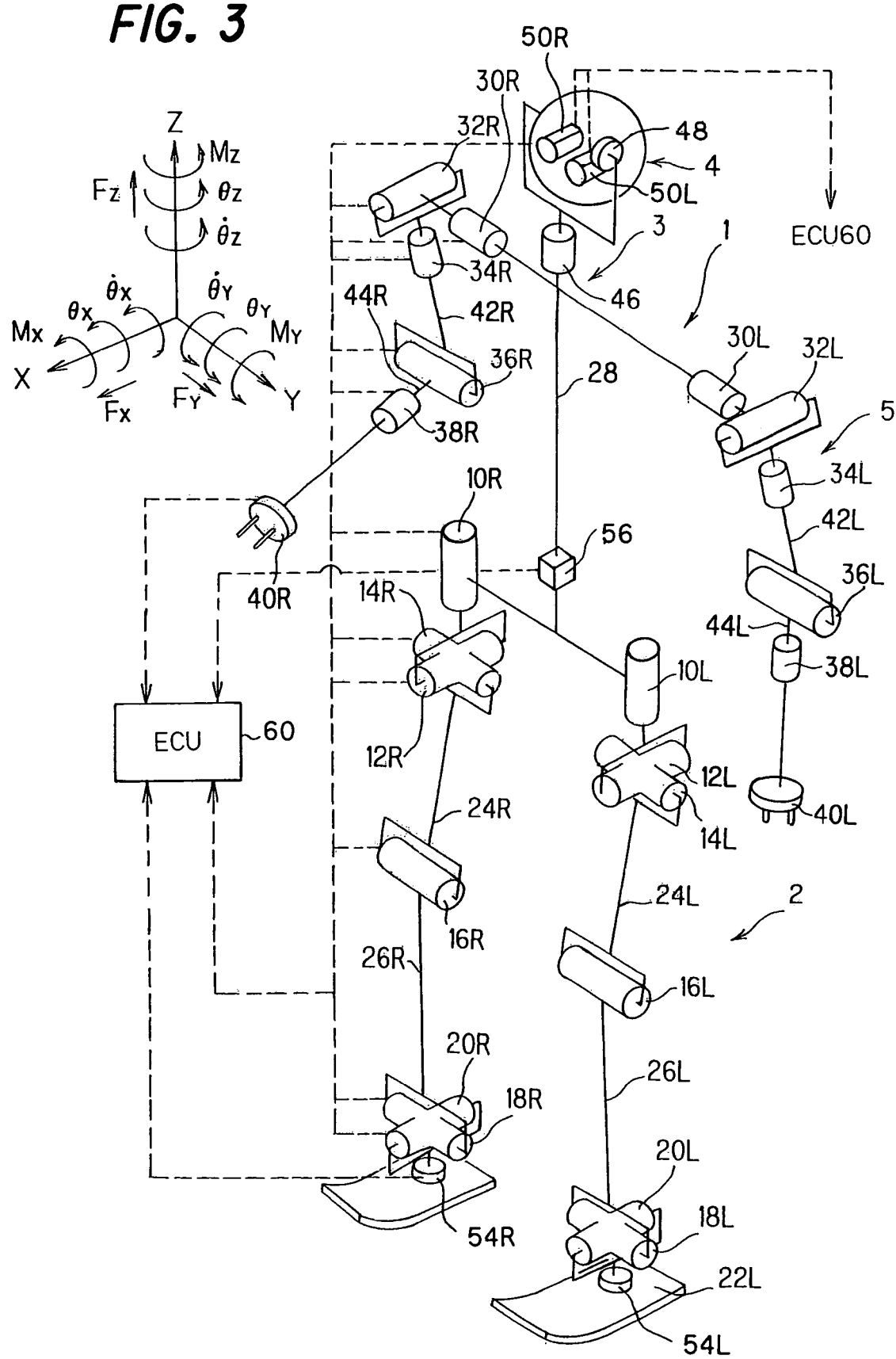
FIG. 3 is a schematic diagram showing the overall internal structure of the biped robot of FIG. 1 with focus on the joints.

The legs 2 are connected through the crotch joints to the body 3, which is represented in FIG. 3 simply by a body link 28. The arms 5 are connected to the body 3, as set out above. The arms 5 include pitch direction joints 30R, 30L of shoulders, roll direction joints 32R, 32L of the shoulders, joints 34R, 34L around the vertical axis for arm swiveling, joints 36R, 36L around the pitch axis of elbows, and joints 38R, 38L around the vertical axis for wrist swiveling. Hands (end effectors) 40R, 40L are attached to the distal ends of the wrists.

Thus each arm 5 includes the shoulder joints 30R(L), 32R(L), 34R(L), the elbow joint 36R(L) and the wrist joint 38R(L). Further, the shoulder joints and the elbow joint are connected by an upper arm link 42R(L) and the elbow joint and the hand by a forearm link 44R(L).

The head 4 includes a neck joint 46 around a vertical axis and a head rotation mechanism 48 for rotating the head 4 around an axis perpendicular thereto. Two CCD cameras (imaging means) 50R(L) are mounted laterally in parallel inside the head 4 so as to produce stereoscopic (binocular) images. The color image obtained from each CCD camera 50R(L) is sent to the ECU, which uses it to perform moving object detection processing as explained in detail later. Each CCD camera 50R(L) has a 320×240 pixel matrix and a field of vision measuring 60 degrees horizontally and 40 degrees vertically.

Owing to the foregoing configuration, the right and left legs 2 of the robot 1 are imparted with a total of twelve degrees of freedom, so that during locomotion the legs as a whole can be imparted with desired movements by driving the twelve joints to appropriate angles to enable desired walking in three-dimensional space. Further, the left and right arms 5 are each given five degrees of freedom, so that desired operations can be carried out by driving these joints to appropriate angles. The robot 1 is about 1.2 m tall and walks in steps of 0.335 m [meter]. Its maximum walking speed is 3.6 km/hr.

A conventional six-axis force sensor 54R(L) is attached to the foot member 22R(L) below the ankle joint and, of the external forces acting on the robot, detects and outputs signals representing the floor reaction force components Fx, Fy and Fz of three directions and the moment components Mx, My and Mz of three directions acting on the robot from the surface of contact. In addition, an inclination sensor 56 installed on the body 3 outputs a signal representing inclination relative to vertical and the angular velocity thereof.

As mentioned above, an ECU 60 including a microcomputer is, together with other components, housed inside the housing unit 6, and the outputs of the six-axis force sensors 54R(L) and other sensors and the image outputs of the CCD cameras 50R(L) are sent to the ECU 60.

Figure 4:
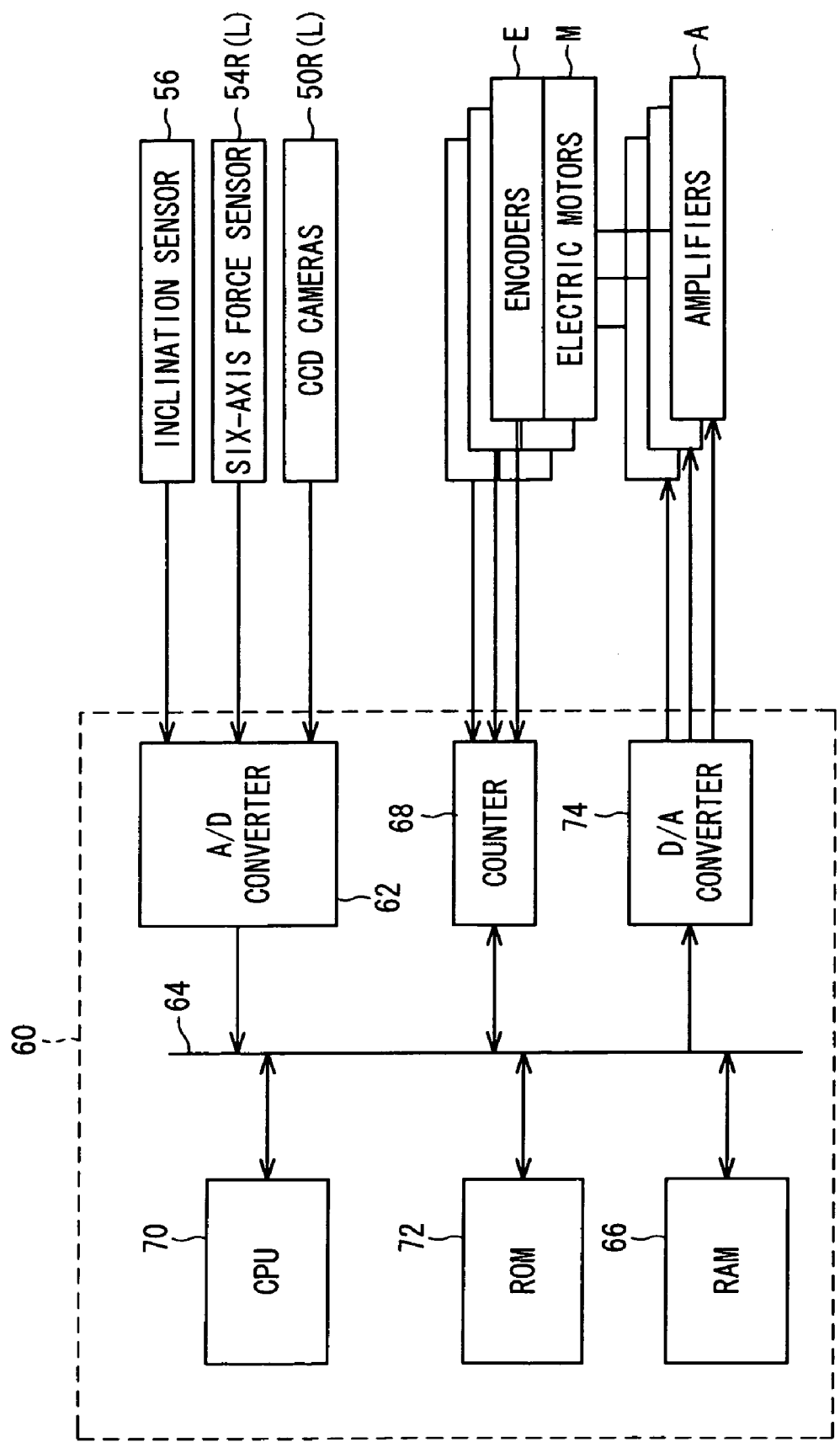
FIG. 4 is a block diagram showing details of an ECU (electronic control unit) illustrated in FIG. 3.

FIG. 4 is a block diagram showing the configuration of the ECU 60 in detail. As illustrated, the outputs from the six-axis force sensors 54R(L), CCD cameras 50R(L) etc. are converted into digital signals by an A/D converter 62 inside the ECU 60 and sent via a bus 64 to a RAM 66 for storage. Further, the outputs of encoders E installed adjacent to the electric motors M at the respective joints are inputted to the RAM 66 through a counter 68.

A CPU 70 is incorporated in the ECU 60. Operating at a frequency of 1.1 GHz, the CPU 70 utilizes data stored in a ROM 72 and the various outputs stored in the RAM 66 to compute the control values (manipulated variables) of the electric motors M needed for driving the joints and outputs them to the motors M through a D/A converter 74 and amplifiers A.

The operation of the ECU 60, more specifically the CPU 70 incorporated therein, is functionally illustrated by the block diagram of FIG. 5 and will now be explained with reference to this figure.

As shown, the operation of the CPU 70 includes a captured image analysis block 70A for analyzing images captured by or inputted from the right and left CCD cameras 50R and 50L, a moving object detection block 70B for utilizing the analyzed images to detect any moving object present and compute the distance and angle thereof relative to the robot 1, and a collision avoidance block 70C for utilizing the computed relative distance and relative angle to stop the robot 1 when necessary for avoiding collision between the moving object and the robot 1.

The captured image analysis block 70A is composed of a distance image generator 70a, a difference image generator 70b, an edge image generator 70c and a flesh color region image generator 70d.

The distance image generator 70a utilizes the parallax of two images captured or taken simultaneously by the left-side CCD camera 50L and right-side CCD camera 50R to generate a distance image DeI indicating the (depthwise) distance from the robot 1 to the imaged object. Specifically, the distance image generator 70a uses the left-side CCD camera 50L as the reference camera, block matrixes the image taken by the reference left-side CCD camera 50L (called "basic image BI") and the image captured or taken at the same time point by the right-side camera 50R (called "simultaneous image") in blocks of a predetermined size (e.g., 16×16 pixels), measures the parallax relative to the basic image, and associates the magnitude of the measured parallax (amount of parallax) with the pixels of the basic image to generate the distance image DeI. Larger parallax means that the CCD cameras 50R(L) are closer to the imaged object and smaller parallax means that they are farther from it.

Figure 6:
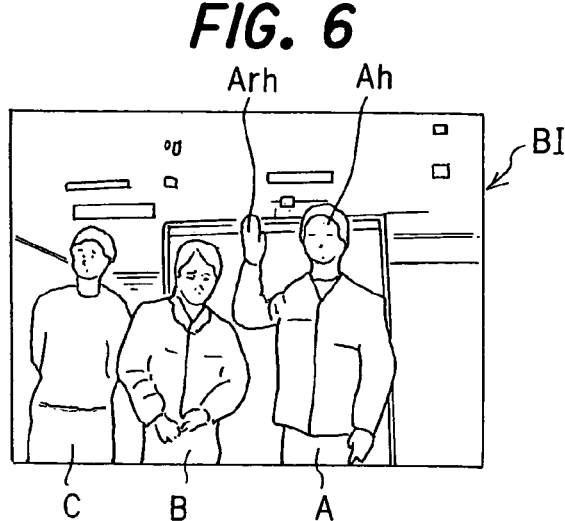
FIG. 6 is an explanatory view showing a basic image taken by a left-side CCD camera illustrated in FIG. 5.

FIG. 6 shows a basic image BI taken by the left-side CCD camera 50L. The explanation that follows is based on this image of three persons. The person on the right (from the viewpoint of the observer) in basic image BI is designated person A, the person in the middle, person B, and the person on the left, person C. Person A has his right hand Arh raised to the right side of his head Ah. In real space, person A and person B are standing at positions 1.63 m away from the CCD cameras 50R(L) and person C is standing at a position 1.96 m away from the CCD cameras 50R(L).

Figure 7:
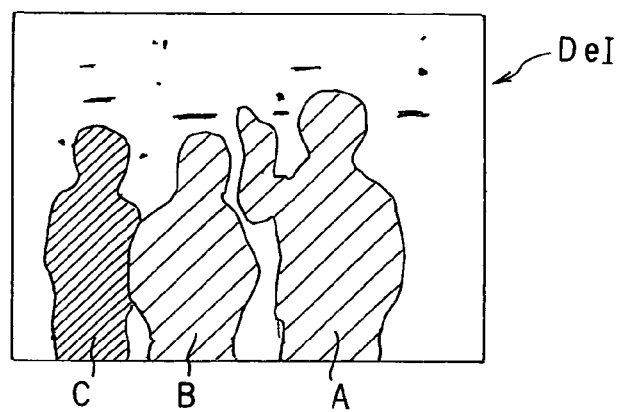
FIG. 7 is an explanatory view showing a distance image generated by a distance image generator illustrated in FIG. 5.

FIG. 7 shows the distance image DeI generated by the distance image generator 70a. The pixel values of the distance image DeI are expressed as parallax so that, as can be seen in FIG. 7, the image is brighter nearer the CCD cameras 50R(L) (persons A and B) and darker farther from the CCD cameras 50R(L) (person C). For ease of understanding, this difference in image lightness/darkness is represented in FIG. 7 as difference in hatching line spacing. That is, in FIG. 7, brighter (nearer) regions are represented by more widely spaced hatching and darker (more distant) regions by more narrowly spaced hatching. The black spots are objects far from persons A, B and C (where parallax is small).

Figure 5:
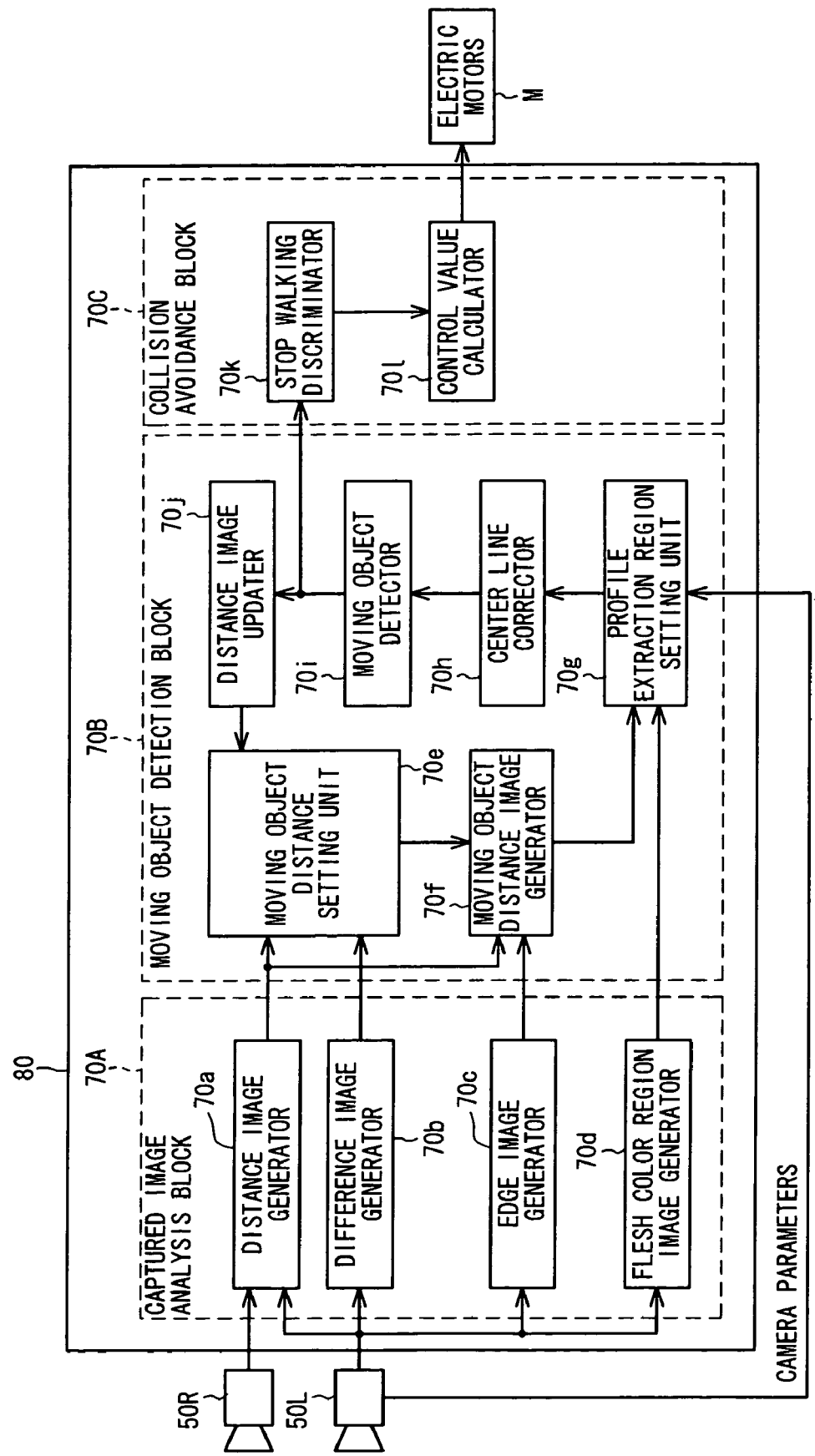
FIG. 5 is a block diagram functionally showing the configuration and the operation of the ECU illustrated in FIG. 4, specifically a CPU incorporated in the ECU.

The difference image generator 70b in FIG. 5 calculates the difference between two basic images BI sequentially captured by the left-side CCD camera 50L and uses the result to generate a difference image DiI. Specifically, the difference image generator 70*b* calculates the difference between two basic images BI captured or taken sequentially by the left-side CCD camera 50L (at time t and time t+Δt), assigns pixels in which a difference occurred a pixel value of 1 on the presumption that they are pixels where motion occurred and assigns pixels in which no difference occurred a pixel value of 0 on the presumption that they are pixels where no motion occurred, thereby generating the difference image DiI. The difference image generator 70*b* eliminates noise from the generated difference image DiI by subjecting it to appropriate file processing such as median filter processing. Moreover, when movement of the robot 1 between time t and time t+Δt causes a change in the background of the basic image BI, the basic image BI captured at time t+Δt is corrected based on the distance that the CCD camera 50L moved so as to detect only the difference caused by movement of the moving objects.

Figure 8:
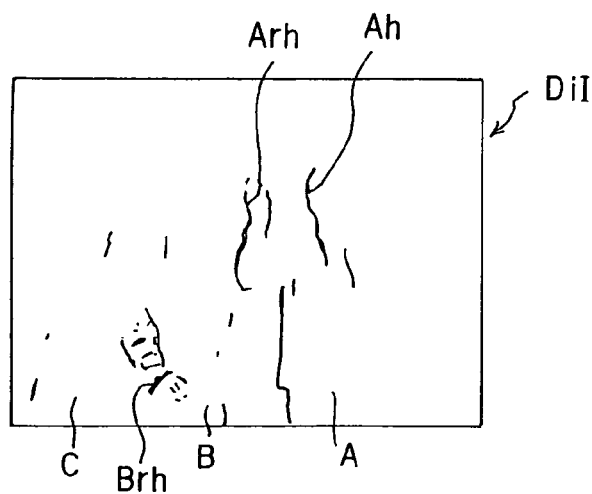
FIG. 8 is an explanatory view showing a difference image generated by a difference image generator illustrated in FIG. 5.

FIG. 8 shows the difference image DiI generated by the difference image generator 70*b*. The black regions in this figure are ones assigned a pixel value of 1, i.e., are ones whose pixels experienced movement. The white regions are ones assigned a pixel value of 0, i.e., ones whose pixels did not experience movement. FIG. 8 therefore shows that the right hand Arh and head Ah of person A moved most between time t and time t+Δt.

The edge image generator 70*c* in FIG. 5 utilizes the basic image BI captured by the left-side CCD camera 50L to generate an edge image EI. Specifically, the edge image generator 70*c* detects or extracts edge pixels defined as pixels where the change in brightness in the basic image BI exceeds a predetermined level and generates an edge image EI composed solely of the detected edges. To be still specific, the edge detection is carried out by applying an operator (e.g., a Sovel operator) having a prescribed weighting coefficient to the whole image, calculating the product of the corresponding pixel brightness values, and detecting as edges the line segments whose difference from adjacent segments is greater than a prescribed value in row or column units.

Figure 9:
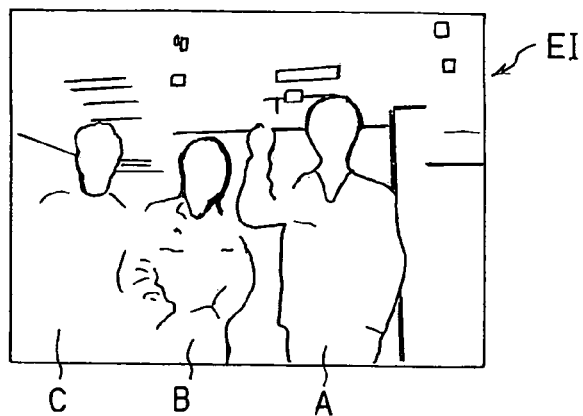
FIG. 9 is an explanatory view showing an edge image generated by an edge image generator illustrated in FIG. 5.

FIG. 9 shows the edge image EI generated by the edge image generator 70*c*. Boundaries of the background features and each of persons A, B and C have been detected as edges.

The flesh color region image generator 70*d* in FIG. 5 extracts flesh color regions from the basic image BI captured by the left-side CCD camera 50L and uses them to generate a flesh color region image CI. Specifically, the flesh color region image generator 70*d* transforms the basic image BI from RGB (Red, Green, Blue) value to HLS (Hue, Luminance, Saturation) space, assigns a value of 1 to pixels whose hue, luminance and saturation all exceed predefined thresholds related to flesh color on the presumption that they are pixels exhibiting flesh color, and assigns a value of 0 to other pixels on the presumption that they are pixels exhibiting colors other than flesh color, thereby generating the flesh color region image CI. The flesh color region image generator 70*d* eliminates noise from the generated flesh color region image CI by subjecting it to appropriate filter processing such as median filter processing.

Figure 10:
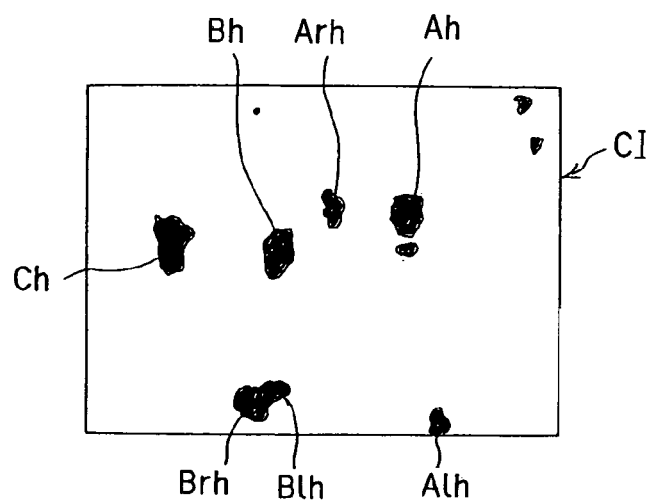
FIG. 10 is an explanatory view showing a flesh color region image generated by a flesh color region image generator illustrated in FIG. 5.

FIG. 10 shows the flesh color region image CI generated by the flesh color region image generator 70*d*. The black regions in this figure are ones assigned a pixel value of 1, i.e., regions composed of pixels exhibiting flesh color. The white regions are ones assigned a pixel value of 0, i.e., regions composed of pixels of colors other than flesh color. It can be seen that flesh color portions of persons A, B and C, namely, their heads (faces) Ah, Bh and Ch, the right hands (palms) Arh, Brh of persons A and B, and the left hands (palms) Alh, Blh of persons A and B, were extracted from the basic image BI as flesh color regions. The hands of person C were not extracted as flesh color regions because, as shown in FIG. 6, person C has his hands clasped behind.

The moving object detection block 70B in FIG. 5 is composed of a moving object distance setting unit 70*e*, a moving object distance image generator 70*f*, a profile extraction region setting unit 70*g*, a center line corrector 70*h*, a moving object detector 70*i* and a distance image updater 70*j*.

The moving object distance setting unit 70*e* utilizes the aforesaid distance image DeI and difference image DiI to define or set the distance to the position where the moving object (one of persons A, B, C) is estimated to be present ("moving object distance"). Specifically, for every parallax (distance) represented by the distance image DeI, the moving object distance setting unit 70*e* sums the number of pixels of the difference image DiI at the position corresponding to the parallax, presumes the moving object to be present at the parallax (distance) where the sum is maximum, and defines it as the moving object distance.

In the difference image shown in FIG. 8, the right hand Arh and head Ah of person A and the left hand Brh of person B moved most, so in the distance image DeI shown in FIG. 7 the parallax representing a distance of 1.63 m from the CCD cameras 50R(L) is defined as the moving object distance. The moving object distance setting unit 70*e* stores the captured or inputted distance image DeI and difference image DiI in the RAM 66.

The moving object distance defined by the moving object distance setting unit 70*e* of FIG. 5 is outputted to the moving object distance image generator 70*f*. The moving object distance image generator 70*f* extracts the pixels corresponding to the moving object distance from the edge image EI and generates a moving object distance image TDeI.

Figure 11:
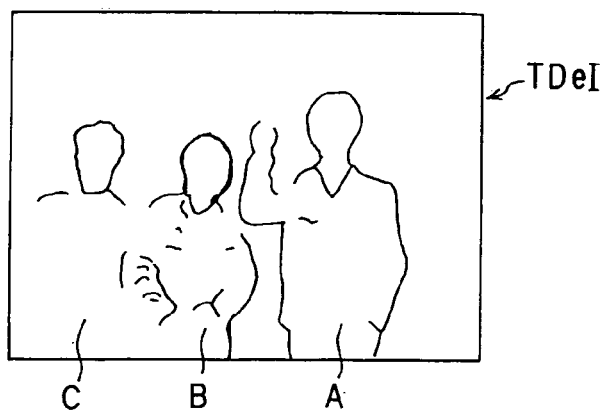
FIG. 11 is an explanatory view showing a moving object distance image generated by a moving object distance image generator illustrated in FIG. 5.

Specifically, the moving object distance image generator 70*f* defines the parallax range (depth) of moving object distance ±α as the parallax range in which the moving object with the largest movement is present. The value of α here is set at 0.5 m, for example, when the moving object is presumed to be a person. Therefore, as shown in FIG. 11, the edges extracted into the moving object distance image TDeI include not only those of persons A and B but also edges of person C positioned 0.33 m behind persons A and B. On the other hand, edges of background features beyond this distance are eliminated.

The moving object distance image TDeI generated by the moving object distance image generator 70*f* is sent to the profile extraction region setting unit 70*g*. The profile extraction region setting unit 70*g* sums the number of pixels in the moving object distance image TDeI to produce a histogram, defines the position where the summed number of pixels is greatest as a center line, and defines in the moving object distance image TDeI the profile extraction region where extraction of the moving object profile is to be conducted.

Figure 12:
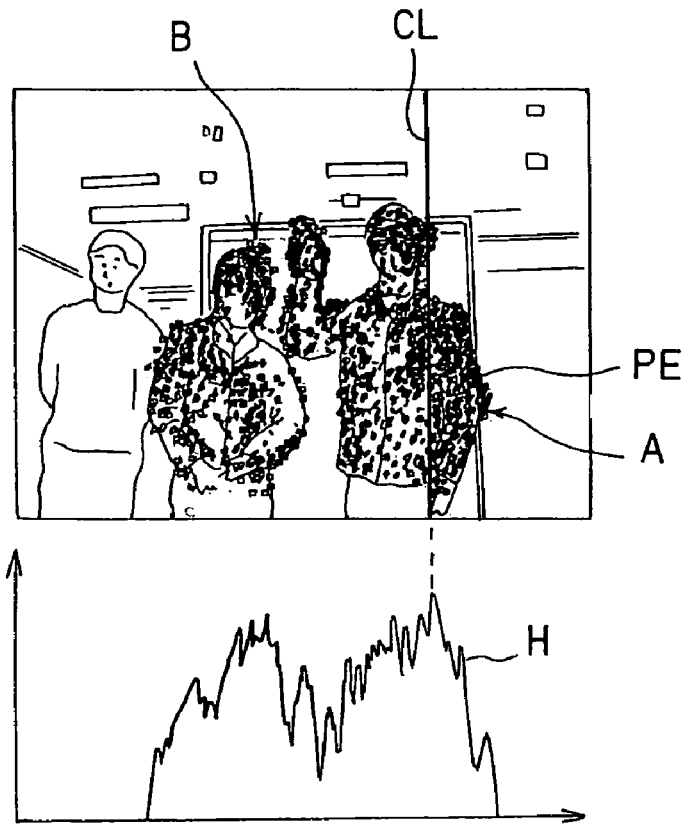
FIG. 12 is an explanatory view showing a histogram and a center line defined by a profile extraction region setting unit illustrated in FIG. 5.

Specifically, the profile extraction region setting unit 70*g* sums the number of pixels in the vertical direction of the moving object distance image TDeI generated by the moving object distance image generator 70*f* to produce a histogram. FIG. 12 shows the pixels in the vertical direction of the moving object distance image TDeI (symbol PE) and the histogram produced (designated by symbol H). In FIG. 12 (and also in FIGS. 13 and 15 discussed below), the background portion of the basic image BI shown in FIG. 6 is superimposed behind the pixels PE for ease of understanding.

Figure 13:
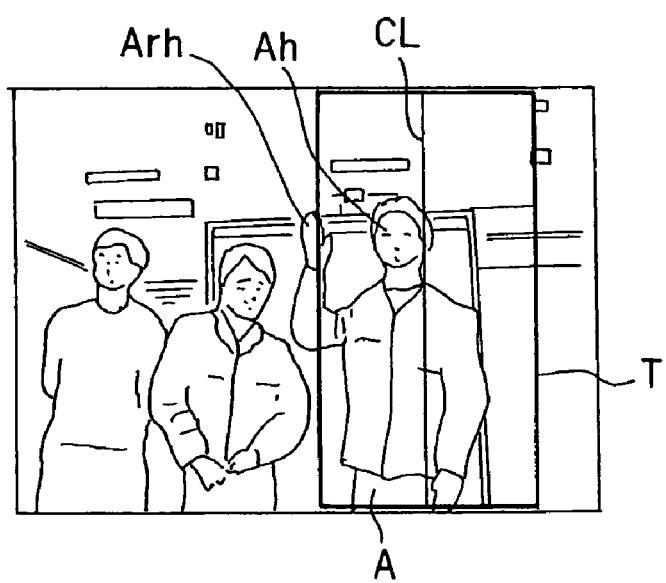
FIG. 13 is an explanatory view showing a profile extraction region set by the profile extraction region setting unit shown in FIG. 5.

The profile extraction region setting unit 70*g* further defines the position where the produced histogram H is greatest as center line CL. Then, as shown in FIG. 13, it defines a profile extraction region T centered on the so-defined center line CL in which extraction of the moving object profile is to be conducted as will be explained later. More specifically, the profile extraction region T is defined to have a predetermined horizontal length (width) centered on the center line CL and to have a predetermined vertical length (height).

In the case where the moving object turns out to include two adjacent moving objects (persons A and B), therefore, profile extraction can be carried out after separating the individual moving objects. When the moving object is presumed to be a person, the predetermined horizontal length is set to around the breadth of a person's shoulders, e.g., to 0.5 m. The length in the vertical direction is set based on the distance to the moving object and certain camera parameters (including, for example, the pan and tilt angles of the CCD cameras 50R(L)) so as to enable thorough coverage of the moving object. When the moving object is presumed to be a person, it is set to 2.0 m, for example.

The position where the histogram H is greatest is defined as the center of the profile extraction region T because this can be considered where the center of the moving object is located. (Explained with reference to FIG. 13, this would mean the position where the head Ah of person A is located.) Owing to the fact that the moving object distance image TDeI is generated based on the edge image EI, however, many pixels are present near the boundary.

Therefore, as shown in FIG. 13, the position where the histogram H is greatest, i.e., the center line CL, may be shifted away from the center of the head (head Ah of person A) toward one edge. Since the profile extraction region T is given a size matched to the moving object to be detected, a shift of the center line CL away from the center of the moving object results in part of the moving object being projected outside the profile extraction region T (as is the right hand Arh of person A (in FIG. 13). This makes accurate detection of the moving object difficult. Although the whole of the moving object can be fit in the region by expanding the profile extraction region T, this solution is best avoided because the need to carry out profile extraction of the moving object in the expanded profile extraction region T might substantially increase the processing load.

In this embodiment, therefore, the center line CL defined by the profile extraction region setting unit 70g is corrected so that the profile extraction region T assumes a suitable position.

The center line CL and profile extraction region T defined by the profile extraction region setting unit 70g of FIG. 5 are sent to the center line corrector 70h, which utilizes the edge image EI to correct the center line CL position and the profile extraction region T.

Specifically, the center line corrector 70h is supplied with the moving object distance image TDeI whose edge image EI, center line CL and profile extraction region T have been defined, overlays the edge image EI and moving object distance image TDeI, and corrects the center line CL.

As the edge image EI coincides well with the outline of the moving object, the center line CL can be accurately positioned at the center of the moving object by correcting the center line CL to the position where the peak of the edge image EI appears in the vertical direction (i.e., to the center of the head where the highest point of the moving object is present).

However, the edge image EI may include multiple peaks, such as when a person (e.g., person A in FIG. 9) raises his/her hand to a height near that of the head, so that a question may arise regarding which of the multiple peaks should be recognized as the head.

The center line corrector 70h is therefore configured to receive the flesh color region image CI generated by the flesh color region image generator 70d, compare the received flesh color region image CI with multiple flesh color region patterns stored in a database DB (shown in FIG. 14) to find the best match pattern, and determine which peak of the edge image should be recognized as the head in accordance with the best match pattern. The database DB is stored in the ROM 72.

Figure 14:
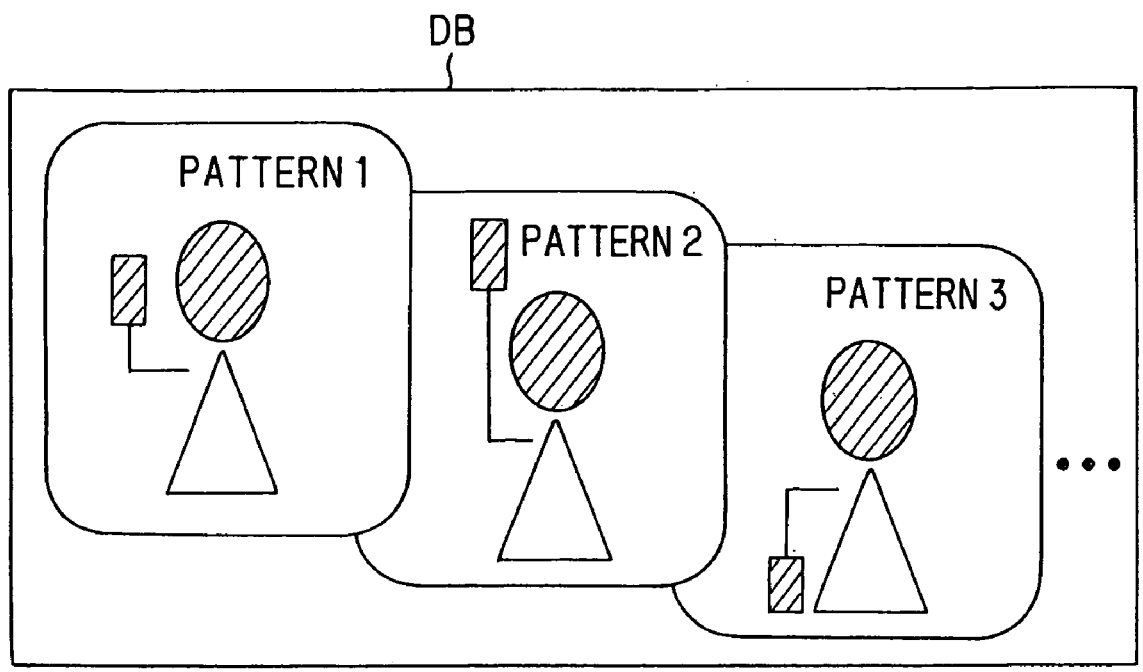
FIG. 14 is an explanatory view showing a database used by a center line corrector illustrated in FIG. 5.

To amplify on the foregoing, the database DB includes multiple patterns like those shown in FIG. 14 each representing a spatial arrangement of flesh color regions (shown as hatched regions) corresponding to head (face) and hand (palm or back) regions. The stored flesh colored region patterns include, for instance, one with a hand positioned at the side of the head (pattern 1), one with a hand raised above the head (pattern 2), one with a hand extended for a handshake (pattern 3), and the like. The center line corrector 70h compares the flesh color region image CI with these patterns and selects the most similar among them, whereby it can discriminate which of the flesh colored regions in the flesh color region image CI represents the head. Obviously, the patterns stored in the database DB need to be appropriately adjusted in accordance with the moving object distance defined by the moving object distance setting unit 70e.

Figure 15:
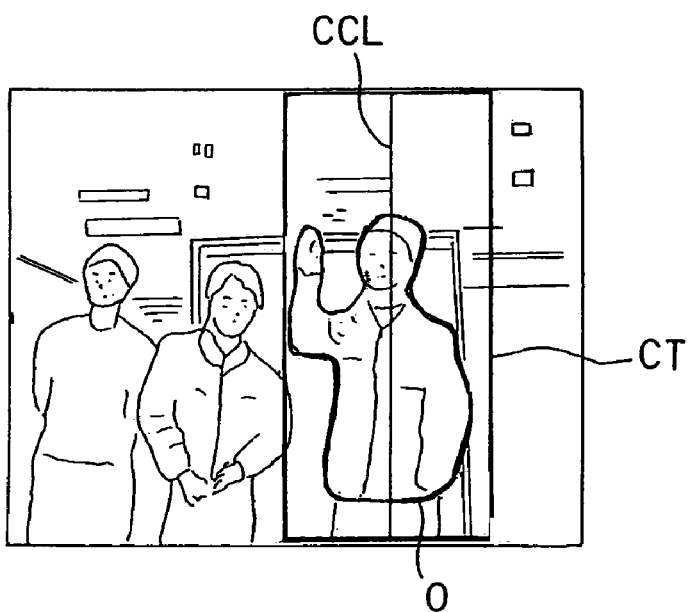
FIG. 15 shows a center line and the profile extraction region corrected by the center line corrector illustrated in FIG. 5.

The center line corrector 70h then positions (corrects) the center line CL of the profile extraction region T to the peak of the edge image EI that corresponds to the flesh colored region recognized as the head in the flesh color region image CI. Thus, the center line CL can be accurately positioned at the center of the moving object even when multiple peaks are present in the edge image EI. FIG. 15 shows the corrected center line CCL and the corrected profile extraction region CT.

As indicated in FIG. 5, the corrected center line CCL and corrected profile extraction region CT defined by the center line corrector 70h are sent to the moving object detector 70i.

The moving object detector 70i detects the moving object (person A) in the corrected profile extraction region CT by using known active profile models (called "snakes") to extract the moving object profile (designated by symbol O in FIG. 15). Further, as shown in FIG. 15, the center of gravity of the moving object (center of gravity of the internal region including the profile O) is calculated, whereafter the distance between the center of gravity of the moving object and the robot 1 (relative distance) m and the direction (relative angle) deg are calculated.

The moving object profile O extracted by the moving object detector 70i and the distance and direction calculated thereby are sent to the distance image updater 70j as moving object information. The distance image updater 70j utilizes the moving object information produced by the moving object detector 70i to update the distance image DeI stored by the moving object distance setting unit 70e.

Specifically, it sets the pixel value of the distance image DeI corresponding to the internal region including the profile O to 0. In other words, after extraction of the moving object profile has been completed, the region where the moving object is present is deleted. Once the distance image updater 70j has updated the distance image DeI, it sends the information to the moving object distance setting unit 70e as updated information. Thus by continuing the forgoing moving object detection processing, person B and person C can be individually detected as moving objects in the next and following processing cycles.

As shown in FIG. 5, the collision avoidance block 70C is composed of a stop walking discriminator 70k and a control value calculator 70l.

The stop walking discriminator 70k receives the moving object information calculated by the moving object detector 70i and utilizes it to determine whether or not to stop walking (i.e., motion) of the robot 1.

Specifically, the walking stop discriminator 70k utilizes the received moving object information to discriminate whether the any moving object is present on the planned walking course of the robot 1 and whether any such moving object has come within a predetermined distance (e.g., 0.9 m). Upon finding that a moving object has come to within 0.9 m on the walking course, it outputs a stop walking command. When it finds no moving object on the walking course or only ones that have not approached to within 0.9 m, it outputs a continue walking command.

The stop walking command or continue walking command outputted by the walking stop discriminator 70k is sent to the control value calculator 70l. Upon receiving the stop walking command, the control value calculator 70l calculates control values for operating the electric motors M that drive the joints concerned so as to stop the walking of the robot 1 and outputs the calculated control values to the electric motors M through the aforesaid amplifiers etc. Upon receiving the continue walking command, the control value calculator 70l calculates and outputs control values for operating the electric motors M so as to continue the walking of the robot 1 along the planned walking course. The technique used to generate the gait of the robot 1 will not be set out here because it is described in detail in the assignee's Japanese Laid-Open Patent Application No. 2002-326173.

The robot 1 usually cannot be brought to a halt smoothly and safely in a single walking step. Two steps are generally required. Since, as mentioned earlier, the robot 1 walks in steps of 0.335 m, it is necessary to presume that at least 0.67 m of robot movement (two steps) is necessary following the location at which the stopping gait (gait for smooth transition from walking to standstill) is initiated in order to ensue smooth and safe stopping of the robot 1. Moreover, the robot 1 moves a distance proportional to its walking speed during the period that starts with the imaging of the object by the CCD cameras 50R(L), continues through the detection of the moving object and the making of a determination to stop, and ends with the output of the control values. The robot 1 therefore moves more than 0.67 m between the time that the CCD cameras 50R(L) capture an image showing that the robot 1 and the moving object have come to within the predetermined distance (0.9 m) of each other in real space and the time that the robot 1 actually comes to a standstill.

In this embodiment, therefore, collision of the robot 1 and the moving object is avoided by defining the processing time period between imaging of the object by the CCD cameras 50R(L) and output of the control values calculated for the electric motors M in accordance with a predetermined condition.

The predetermined condition referred to here is that the relative speed between the robot 1 and moving object is a predetermined value, specifically that the robot 1 is walking at maximum speed. This predetermined condition thus means that the relative speed between the robot 1 and moving object is high. In order to stop the robot 1 before colliding with the moving object, it suffices for the distance moved by the robot 1 during the foregoing processing to be within 0.9−0.67=0.23 m. The distance moved during processing is the product of the processing time and the walking speed of the robot 1. Collision of the robot 1 with the moving object can therefore be avoided by setting the processing time so that the distance moved during processing when the robot 1 is walking at maximum speed (3.6 km/hr) does not exceed 0.23 m.

Figure 16:
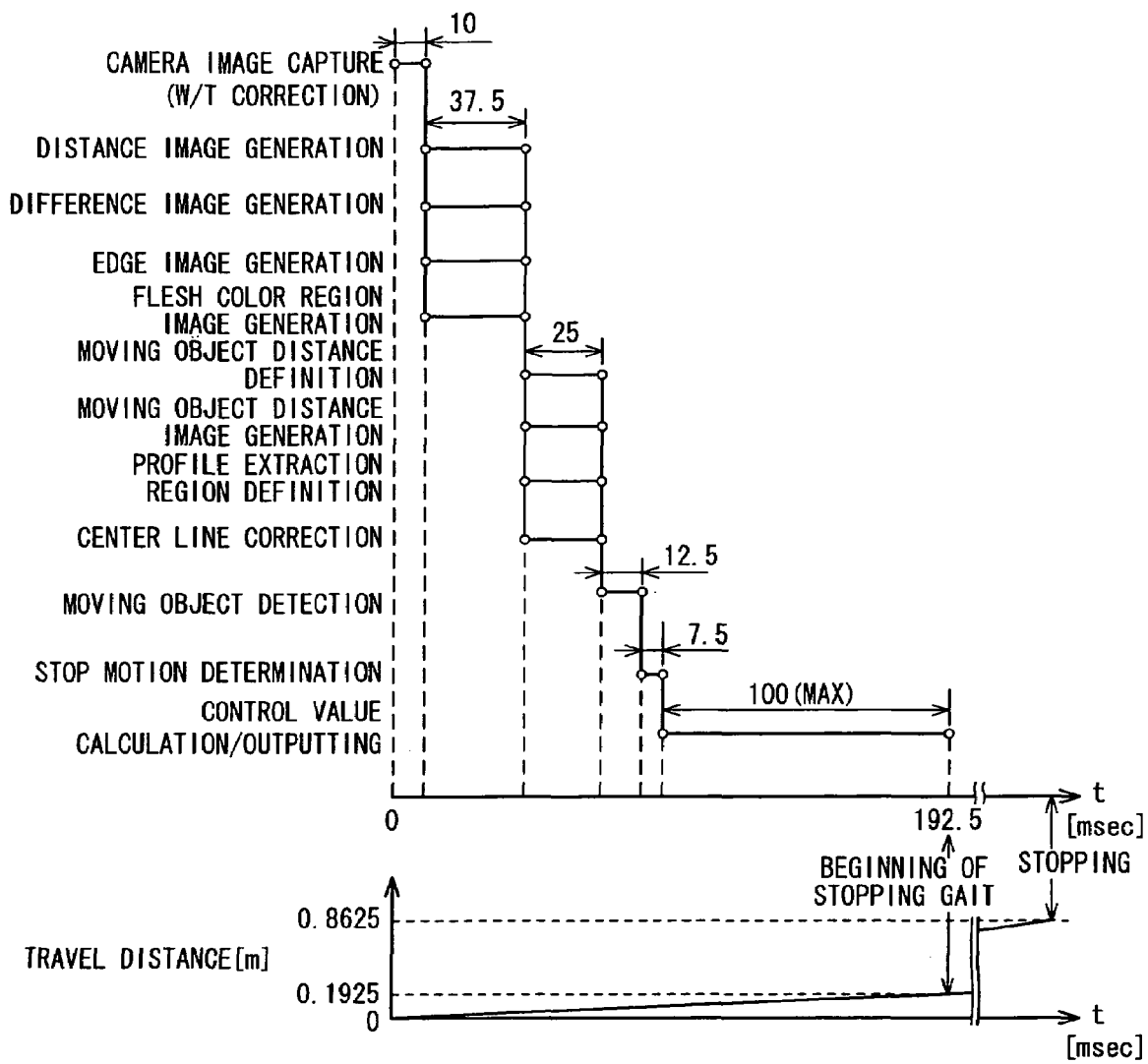

FIG. 16 is a time chart mainly showing the processing steps in the course of stopping the robot 1 and the time periods required for each step.

As shown in FIG. 16, the processing period from capture of camera images to output of control values is set at a maximum of 192.5 msec.

Specifically, a processing period of 10 msec is set as that required for imaging by the CCD cameras 50R(L) and carrying out appropriate correction for acquiring the basic image BI and simultaneously captured images, and a processing period of 37.5 msec is set as that required for utilizing these images to generate the distance image DeI, difference image DiI, edge image EI and flesh image CI. In other words, a total of 47.5 msec is set as the time required for the captured or inputted image analysis conducted in the captured or inputted image analysis block 70A.

A processing period of 25 msec is set as that required for utilizing the distance image DeI and difference image DiI to define the moving object distance and generate the moving object distance image TDeI and then to define the profile extraction region T in the moving object distance image TDeI and correct the center line CL therein. Further, a processing period of 12.5 msec is set as that required to detect the moving object by using active profile models to extract the profile O from the corrected profile extraction region CT and then calculate the moving object information. In other words a total of 37.5 msec is set as the time required for the moving object detection processing, including the processing for calculation of the moving object information (relative distance, relative angle etc.) conducted in the moving object detection block 70B.

A processing period of 7.5 msec is set as that required for utilizing the calculated moving object information to determine whether or not to make the robot 1 stop walking, and a maximum processing period of 100 msec is set as that required for calculating and outputting control values for implementing a stopping gait when a stop walking command is outputted. In other words, a maximum of 107.5 msec is set as the time required for the processing conducted by the collision avoidance block 70C.

The total processing period between object imaging by the CCD cameras 50R(L) and calculation/output of the electric motor M control value is thus set at 192.5 msec. The travel distance of the robot 1 during the foregoing processing is therefore 0.1925 m, i.e., shorter than 0.23 m. The robot 1 can therefore be stopped before colliding with the moving object, because the distance the robot 1 travels between the time that the CCD cameras 50R(L) capture images indicating that the robot 1 and moving object have come within the predetermined distance (0.9 m) of each other in real space and the time that the robot 1 actually comes to a standstill (travel distance at stopping) is 0.8625 m (0.1925+0.67) at maximum.

As explained in the foregoing, this embodiment is configured to have a system for controlling the biped robot 1 having the body 3 and two legs 2 each connected to the body, comprising: a plurality of cameras (two CCD cameras) 50R(L) mounted on the robot and capturing a stereoscopic image around the robot; captured image analyzer (the captured image analysis block 70A) inputting and analyzing the image captured by the cameras; moving object detector (the moving object detection block 70B) detecting presence of a moving object (persons A, B and C) around the robot based on the analyzed image (the distance image DeI, the difference image DiI, the edge image EI and the flesh color region image CI)

and if detected, calculating a position and an angle of the moving object relative to the robot (moving object information); stop motion determinator determining (the stop walking discriminator 70$k$) whether a motion of the robot needs to be stopped based on the detected position and angle of the moving object relative to the robot; and robot motion controller (the control value calculator 70$l$) controlling the robot to stop the motion when the motion of the robot is determined to be stopped, such that a distance of travel of the robot from the capture of image to the stopping of motion of the robot falls within a predetermined distance (e.g., 0.9 m) 2, more specifically, the robot motion controller controls the robot to stop the motion if the motion of the robot is determined to be stopped when the robot moves at its maximum speed, such that the distance of travel of the robot from the capture of image to the stopping of motion of the robot falls within the predetermined distance. With this, when the robot 1 approaches the moving object during walking, it can be stopped within the predetermined distance to avoid collision with the moving object.

In the system, the moving object detector calculates a speed of the moving object relative to the robot 1; and the robot motion controller (the control value calculator 70$l$) controls the robot to stop the motion such that the distance of travel of the robot falls within the predetermined distance, when the detected speed of the moving object relative to the robot is a predetermined value. Owing to this configuration, the advantageous of the above can be still more effectively realized.

In the system, the predetermined speed is a speed determined when the robot moves at its maximum speed (e.g., 3.6 km/h). Owing to this configuration, the advantageous mentioned above can be still more effectively realized. The moving object is a human being (the person A, B and C).

It should be noted that the moving object includes a living thing like a human being and non-living thing like a vehicle. The moving object also includes not only a whole part or portion of the thing, but also a part or portion of the thing (e.g., an arm or leg of the human being).

It should also be noted that the predetermined distance is not limited to the distance of 0.9 m used as an example in the foregoing but can be appropriately defined in accordance with the robot step length and maximum walking speed (the predetermined condition), the CPU performance and other factors.

It should further be noted that the predetermined speed is defined with reference to the condition when the robot 1 is walking at its maximum walking speed, the predetermined speed can instead be defined to also take into account cases in which the moving object itself is approaching the robot. By this is meant that the predetermined speed can be defined based on the sum of the robot walking speed and the moving object travel speed in the direction of the robot. For this reason, the above is described using the phrase "the speed of the moving object relative to the robot."

Moreover, it is possible to cope with the fact that the travel speed of the moving object in the direction of the robot is not necessarily uniform by changing the predetermined distance as a function of the relative speed between the robot and the moving object. The travel speed of the moving object can calculated by, for example, finding the difference between moving object information calculated at time t and moving object information calculated at time t+Δt. With respect to an object or obstacle that is not a moving object but a stationary object, it suffices to determine whether or not to stop robot walking based on the distance to the stationary object and the walking speed of the robot 1.

While it was explained that a flesh color region image CI is generated by extracting flesh colored regions from the basic image BI, the color used to identify the moving object need not necessarily be flesh color and it is possible to use any color that enables recognition of a moving object feature (particularly an attitude feature).

Japanese Patent Application No. 2003-095484, filed on Mar. 31, 2003, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for controlling a biped robot comprising a body and two legs each connected to the body, the system comprising:
   a plurality of cameras mounted on the robot and capturing a stereoscopic image around the robot;
   captured image analyzer inputting and analyzing the image captured by the cameras;
   moving object detector detecting presence of a moving object around the robot based on the analyzed image and if detected, calculating a position and an angle of the moving object relative to the robot;
   stop motion determinator determining whether a motion of the robot needs to be stopped based on the detected position and angle of the moving object relative to the robot; and
   robot motion controller controlling the robot to stop the motion when the motion of the robot is determined to be stopped, such that a distance of travel of the robot from the capture of image to the stopping of motion of the robot falls within a predetermined distances,
   wherein the stop motion determinator is further configured to set a processing period based upon an amount of time from the capture of the image to the stopping of motion of the robot, the processing period set so that the distance of travel of the robot during the processing period does not exceed a difference of the predetermined distance and a distance traveled by two walking steps of the legs of the robot.

2. The system according to claim 1, wherein the robot motion controller controls the robot to stop the motion if the motion of the robot is determined to be stopped when the robot moves at its maximum speed, such that the distance of travel of the robot from the capture of image to the stopping of motion of the robot falls within the predetermined distance.

3. The system according to claim 1, wherein the moving object detector calculates a speed of the moving object relative to the robot, and the robot motion controller controls the robot to stop the motion such that the distance of travel of the robot falls within the predetermined distance, when the detected speed of the moving object relative to the robot is a predetermined value.

4. The system according to claim 3, wherein the predetermined speed is a speed determined when the robot moves at its maximum speed.

5. The system according to claim 1, wherein the moving object is a human being.

6. A method of controlling a biped robot comprising a body and two legs each connected to the body, the method comprising the steps of:
   capturing a stereoscopic image around the robot;
   inputting and analyzing the captured image;

detecting presence of a moving object around the robot based on the analyzed image and if detected, calculating a position and an angle of the moving object relative to the robot;

determining whether a motion of the robot needs to be stopped based on the detected position and angle of the moving object relative to the robot;

controlling the robot to stop the motion when the motion of the robot is determined to be stopped, such that a distance of travel of the robot from the capture of image to the stopping of motion of the robot falls within a predetermined distance; and setting a processing period based upon an amount of time from the capturing of the image to the controlling the robot to stop the motion, the processing period set so that the distance of travel of the robot during the processing period does not exceed a difference of the predetermined distance and a distance traveled by two walking steps of the legs of the robot.

7. The method according to claim 6, wherein the step of robot motion controlling controls the robot to stop the motion if the motion of the robot is determined to be stopped when the robot moves at its maximum speed, such that the distance of travel of the robot from the capture of image to the stopping of motion of the robot falls within the predetermined distance.

8. The method according to claim 6, wherein the step of moving object detection calculates a speed of the moving object relative to the robot; and the step of controlling controls the robot to stop the motion such that the distance of travel of the robot falls within the predetermined distance, when the detected speed of the moving object relative to the robot is a predetermined value.

9. The method according to claim 8, wherein the predetermined speed is a speed determined when the robot moves at its maximum speed.

10. The method according to claim 6, wherein the moving object is a human being.

\* \* \* \* \*